US008843369B1

(12) United States Patent
Sharifi

(10) Patent No.: US 8,843,369 B1
(45) Date of Patent: Sep. 23, 2014

(54) SPEECH ENDPOINTING BASED ON VOICE PROFILE

(71) Applicant: Google Inc., Mountain View, CA (US)

(72) Inventor: Matthew Sharifi, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/142,399

(22) Filed: Dec. 27, 2013

(51) Int. Cl.
*G10L 15/26* (2006.01)
*G10L 17/00* (2013.01)
*G10L 21/00* (2013.01)

(52) U.S. Cl.
CPC .................................... *G01L 15/18* (2013.01)
USPC ........ 704/235; 704/246; 704/270; 704/270.1; 704/275

(58) Field of Classification Search
USPC ...................... 704/235, 246, 270, 270.1, 275
See application file for complete search history.

(56) References Cited

U.S. PATENT DOCUMENTS

| | | | | |
|---|---|---|---|---|
| 6,321,197 | B1 | 11/2001 | Kushner | |
| 6,324,509 | B1 | 11/2001 | Bi | |
| 7,035,807 | B1 * | 4/2006 | Brittain et al. | 704/278 |
| 8,165,880 | B2 | 4/2012 | Hetherington | |
| 8,170,875 | B2 | 5/2012 | Hetherington | |
| 8,554,564 | B2 | 10/2013 | Hetherington | |
| 2001/0034601 | A1 * | 10/2001 | Chujo et al. | 704/233 |
| 2005/0108011 | A1 * | 5/2005 | Keough et al. | 704/243 |
| 2009/0149166 | A1 * | 6/2009 | Habib et al. | 455/414.3 |
| 2010/0017209 | A1 * | 1/2010 | Yu et al. | 704/246 |
| 2010/0131279 | A1 * | 5/2010 | Pilz | 704/273 |
| 2010/0280827 | A1 * | 11/2010 | Mukerjee et al. | 704/236 |
| 2011/0153309 | A1 * | 6/2011 | Kim et al. | 704/2 |
| 2011/0264447 | A1 * | 10/2011 | Visser et al. | 704/208 |

FOREIGN PATENT DOCUMENTS

WO W00186633 A1 11/2001

OTHER PUBLICATIONS

Ferrer et al., "A Prosody-Based Approach to End-of-Utterance Detection that does not require Speech Recognition," IEEE International Conference on Acoustics, Speech, and Signal Processing, 2003, 1:I-608-I-611.
Ferrer et al., "Is the Speaker done yet? Faster and more accurate End-of-Utterance detection using Prosody," Interspeech, ISCA, (2002), 2061-2064.

* cited by examiner

*Primary Examiner* — Edgar Guerra-Erazo
(74) *Attorney, Agent, or Firm* — Fish & Richardson P.C.

(57) ABSTRACT

Methods, systems, and apparatus, including computer programs encoded on a computer storage medium, for speech endpointing based on a voice profile. In one aspect, a method includes the actions of receiving audio data corresponding to an utterance spoken by a particular user. The actions further include generating a voice profile for the particular user using at least a portion of the audio data. The actions further include determining in the audio data a beginning point or an ending point of the utterance based at least in part on the voice profile for the particular user. The actions further include based on the beginning point, the ending point, or both the beginning point and the ending point, outputting data indicating the utterance.

20 Claims, 3 Drawing Sheets

SPEECH ENDPOINTING BASED ON VOICE PROFILE

TECHNICAL FIELD

This disclosure generally relates to speech recognition, and one particular implementation relates to generating and using voice profiles.

BACKGROUND

Computers that possess natural language processing capabilities often have to determine which portions of a voice input include speech that is likely intended to be processed as a candidate natural language query, and which portions of the voice input include speech that is likely not intended to be processed as a natural language query. Such segmentation of the voice input may involve the use of an endpointer, which operates to isolate the likely starting point and/or the ending point of a particular utterance within the voice input.

Traditional endpointers, which evaluate the duration of pauses between words in designating when an utterance begins or ends, often output inaccurate results. These inaccuracies can result in a voice input being segmented incorrectly, and may further cause an utterance that was intended to be processed as a natural language query to not be processed, or may result in an utterance being processed inaccurately. For instance, consider the following conversation between two people, which is received as a voice input by a computer with natural language processing capabilities:

Speaker 1: "Computer, show me directions to Springfield."

<short pause>

Speaker 2: "No, not Springfield, to Franklin."

<long pause>

Speaker 1: "No, we want Springfield."

Were the endpointer to isolate the likely starting points or ending points of these utterances based solely on the existence of long pauses between words, such a conversation might be improperly segmented as follows:

Input 1: "Computer, show me directions to Springfield, no, not Springfield, to Franklin."

Input 2: "No, we want Springfield."

A natural language processor might interpret the first input as a natural language query in which the speaker corrects themselves midway through the utterance, and may classify the second input as likely not a natural language query. Although the first speaker clearly intends for the computer to provide directions to "Springfield," the incorrect operation of the endpointer may result in the natural language processor misinterpreting this intent, and instead obtaining and presenting directions to "Franklin."

SUMMARY

According to an innovative aspect of the subject matter described in this specification, a computing device may receive an audio input that contains utterances from more than one user, and may determine when a particular user is speaking. The device may analyze an initial portion of first utterance of the audio input and determine acoustic features associated with that initial portion. As the device receives additional audio, the device may extract acoustic features from subsequent frames of the additional audio and compare those acoustic features of the subsequent frames to the acoustic features of the initial portion. Based on that comparison, the device may determine if an utterance in a subsequent frame is from the same user as the initial portion.

Once the device has identified speech as belonging to a particular user, the device may use that data in identifying the users in subsequent audio inputs. Once the device begins receiving subsequent audio inputs, the device can segment the audio input into frames, and can compare each frame to the previous audio data corresponding to the particular user. Based on that comparison, the device can determine whether the speech encoded in each frame was spoken by the particular user.

Using both the comparison based on the initial portion of an audio input and the comparison based on previous speech identified as belonging to a particular user, the device may determine when a particular user is speaking in a received audio input. For example, in a conversation between two people, the device may identify the portion of the audio input corresponding to the first portion of the dialog spoken by a user and each subsequent portions of dialog that are spoken by the user.

In general, another innovative aspect of the subject matter described in this specification may be embodied in methods that include the actions of receiving audio data corresponding to an utterance spoken by a particular user; generating a voice profile for the particular user using at least a portion of the audio data; determining in the audio data a beginning point or an ending point of the utterance based at least in part on the voice profile for the particular user; and based on the beginning point, the ending point, or both the beginning point and the ending point, outputting data indicating the utterance.

These and other embodiments can each optionally include one or more of the following features. The actions further include receiving audio data corresponding to an utterance spoken by a particular user; generating a voice profile for the particular user using at least a portion of the audio data; determining in the audio data a beginning point or an ending point of the utterance based at least in part on the voice profile for the particular user; and based on the beginning point, the ending point, or both the beginning point and the ending point, outputting data indicating the utterance. Generating a voice profile for the particular user using at least a portion of the audio data includes determining acoustic features of the at least the portion of the audio data; based on the acoustic features, determining that the audio data is speech audio data; and generating the voice profile for the particular user based on the acoustic features.

Determining in the audio data a beginning point or an ending point of the utterance based at least in part on the voice profile for the particular user includes determining acoustic features of a subsequent portion of the audio data; determining a subsequent voice profile based on the acoustic features of the subsequent portion of the audio data; comparing the subsequent voice profile with the voice profile for the particular user; and based further on comparing the subsequent voice profile with the voice profile for the particular user, determining in the audio data the beginning point or the ending point of the utterance.

Comparing the subsequent voice profile with the voice profile for the particular user includes comparing using second language similarities. The acoustic features include mel-frequency cepstral coefficients, filterbank energies, or fast Fourier transform frames. A duration of the initial portion of the received audio data is a particular amount of time. Outputting data indicating the utterance includes outputting a time stamp indicating the beginning point or the endpoint point of the utterance. Outputting data indicating the utterance includes outputting the data indicating the utterance to an automatic speech recognizer or a query parser.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A computing device can determine beginning points and ending points of particular user's voice query when other users are speaking. A computing device can determine beginning points and ending points in the presence of background noise, including other voices. A computing device can more accurately classify follow on queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
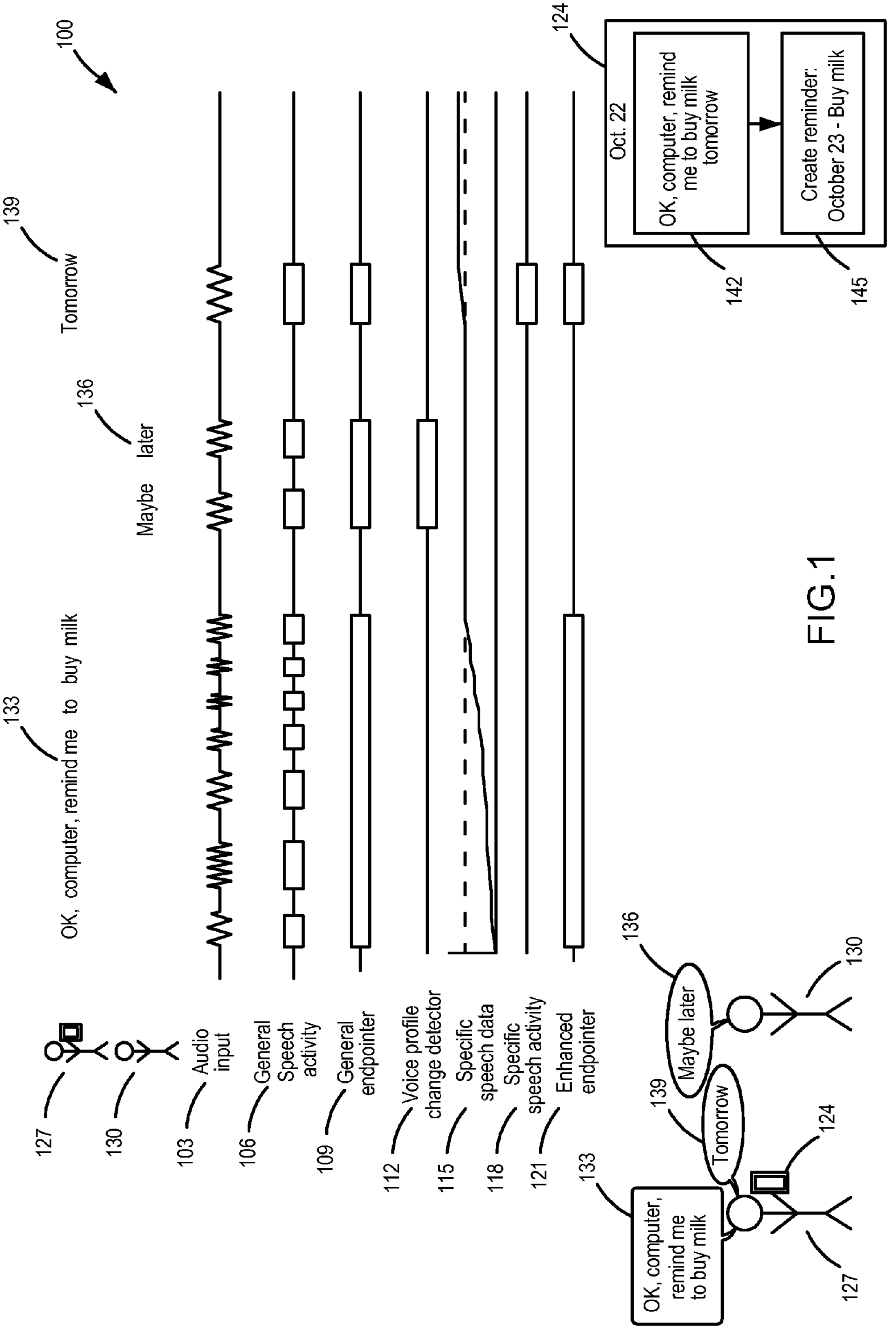
FIG. 1 is a diagram of example signals and utterances used to identify speech beginning points or speech ending points of a particular speaker.

FIG. 1 is a diagram of example signals and utterances 100 used to identify speech beginning points or speech ending points of a particular speaker. In general, the example signals and utterances 100 illustrate signals 103-121 generated or detected by computing device 124 when computing device 124 is processing audio data. The computing device 124 receives an audio input 103 through a microphone or other audio input device of the computing device 124 and identifies a voice command to execute or a natural language query on the audio input 103.

The computing device 124 receives the audio input 103 and samples the audio input 103 at a particular frequency and resolution. For example, the computing device 124 may sample the audio input at 8 kHz, 16 kHz, 44.1 kHz, or any other sample rate, and the resolution may be 16 bits, 32 bits, or any other resolution. Audio input 103 illustrates sampled analog data based on utterances from user 127 and user 130. In the example in FIG. 1, user 127 says, as illustrated by utterance 133, to the computing device 124, "OK computer, remind me to buy milk." User 130 is near user 127 and computing device 124 and says, as illustrated by utterance 136, "Maybe later." User 127 responds, as illustrated by utterance 139, "Tomorrow." The computing device 124 records and stores the audio input 133 of the utterances 133-139.

The computing device 124 identifies general speech activity 106 based on the audio input 103. The general speech activity 106 indicates the presence of human voices in general, not necessarily any particular human's voice. The computing device 124 processes the audio input 103 to identify the portions of the audio input 103 that correspond to human speech. In some implementations, the computing device 124 generates acoustic features of the audio input 103. For example, the acoustic features may be mel-frequency cepstral (MFC) coefficients, filterbank energies, or fast Fourier transform (FFT) frames. The computing device 124 may generate acoustic features based on a particular audio frame. In some implementations, the computing device 124 may generated acoustic features continuously for each audio frame. The audio frames may be, for example, between ten and twenty-five milliseconds in length or twenty-five milliseconds in length with a ten millisecond step. Based on the acoustic features of the audio frames, the computing device 124 can determine where the audio input 103 corresponds to general speech activity. In some implementations, the computing device 124 identifies general speech activity based on classifying features of each audio frame. For example, the computing device 124 may identify general speech activity based on support vector machine learning, generalized method of moments, or neural networks. General speech activity 106 illustrates the location of speech activity in the audio input 103 with blocks.

The computing device 124 identifies ending points in the utterances 133, 136, and 139 as illustrated by the general endpointer signal 109. The beginning point of an utterance is the point where a user likely begins to speak, and the ending point of an utterance is the point where a user likely stops speaking. In some implementations, the beginning points and ending points are based on durations of pauses between utterances. If a duration of a pause satisfies a threshold, then the computing device identifies the beginning of the pause as an ending point and the end of the pause as a beginning point. For example, if user 127 says, "OK computer, remind me to buy milk" and then three seconds user 130 says, "Maybe later," then the computing device 124 may determine there to be a ending point after "milk" and a beginning point before "maybe" if three seconds satisfies the threshold. The threshold may be two seconds and any pause greater than two seconds will signal the end, the beginning, or both the end and the beginning of an utterance.

The computing device 124 identifies a change in the voice profile of audio input 103 as illustrated by the voice profile change detector signal 112. The voice profile change detector signal 112 illustrates a change in the voice profile from an initially generated voice profile. The computing device 124 generates a voice profile of a user based on the acoustic features of an initial portion of speech. For example, if user 127 initially speaks and the computing device 133 receives, "OK computer, remind me to buy milk" or utterance 133, then while the computing device 124 receives and processes utterance 133, the computing device 124 determines a voice profile based on the utterance 133 or an initial portion of utterance 133.

The voice profile uniquely represents the characteristics of a user's voice such as pitch and range. In some implementations, the computing device 124 generates the voice profile based on an initial portion of the audio input identified as general speech. The computing device then generates a subsequent voice profile based on subsequent portions of the audio input. The subsequent voice profiles of portions of the audio input identified as general speech that do not match the initial voice profile are where the voice profile changes occur in the audio input. For example, the voice profile change detector signal 112 illustrates the changes in the voice profile at "maybe later" in the audio input. User 130 said, "Maybe later," and the voice profile corresponding to "maybe later" is different than the voice profile corresponding to the initial voice profile that corresponds to user 127.

In some implementations, the computing device 124 compiles specific speech data as illustrated by the specific speech data signal 115 to generate a voice profile. For example, the computing device 124 receives utterance 133 and with each additional portion of general speech activity the computing device 124 receives additional specific speech data. Once the additional specific speech data satisfies a threshold that indicates a minimum amount of specific speech data needed to generate a voice profile, then computing device 124 can generate a voice profile for the user. The computing device 124 may not receive additional specific speech data to generate the voice profile for the user from utterance 136 because the utterance 136 is spoken by a different user than user 127. The computing device may receive additional specific speech data from utterance 139 because user 127 said utterance 139.

The computing device 124 may use the voice profile generated based on data illustrated by the specific speech data signal 115. The computing device 124 can compare the voice profile to future utterances to determine if the voice profile matches the future utterance. For example, user 130 speaks utterance 136, "Maybe later." As the computing device 124 receives utterance 136, the computing device identifies the acoustic features and determines a voice profile based on the acoustic features. The computing device 124 compares the voice profile based on the utterance 136 to the voice profile generated based on the utterance 133, "OK, computer, remind me to buy milk," and determines that the voice profiles do not match. When the computing device 124 received utterance 139 from user 127, the computing device 124 generates a voice profile based on utterance 139 and determines that the voice profile based on utterance 139 matches the voice profile based on utterance 133. The specific speech activity signal 118 illustrates the match between the voice profile based the specific speech data, or utterance 133, and the voice profiles based on utterances 136 and 139 by illustrating a match below utterance 139.

The computing device 124 may generate an enhanced endpointer signal 124 based on both the general end pointer signal 109 and the specific speech activity signal 118. When the computing device 124 has not gathered any specific speech data, the computing device 124 may determine that the first utterance that the computing device 124 receives corresponds to a user from which the computing device 124 should receive instructions. Once the computing device 124 has gathered specific speech data and generated a voice profile, the computing device 124 can compare that voice profile to voice profiles generated based on future utterances. As is illustrated with the enhanced endpointer signal 121, the computing device 124 determined that a particular user was speaking in utterances 133 and 139 and not in utterance 136.

Based on the data from the enhanced endpointer signal 121, the computing device 124 identifies a command from the user based on combined utterance 142 "OK computer, remind me to buy milk, tomorrow." The computing device 124 processes the combined utterance 142 to determine that the computing device 124 should execute a command. For example, based on the combined utterance 142 "OK computer, remind me to buy milk, tomorrow," the computing device will add a reminder 145 to buy milk the following day.

Figure 2:
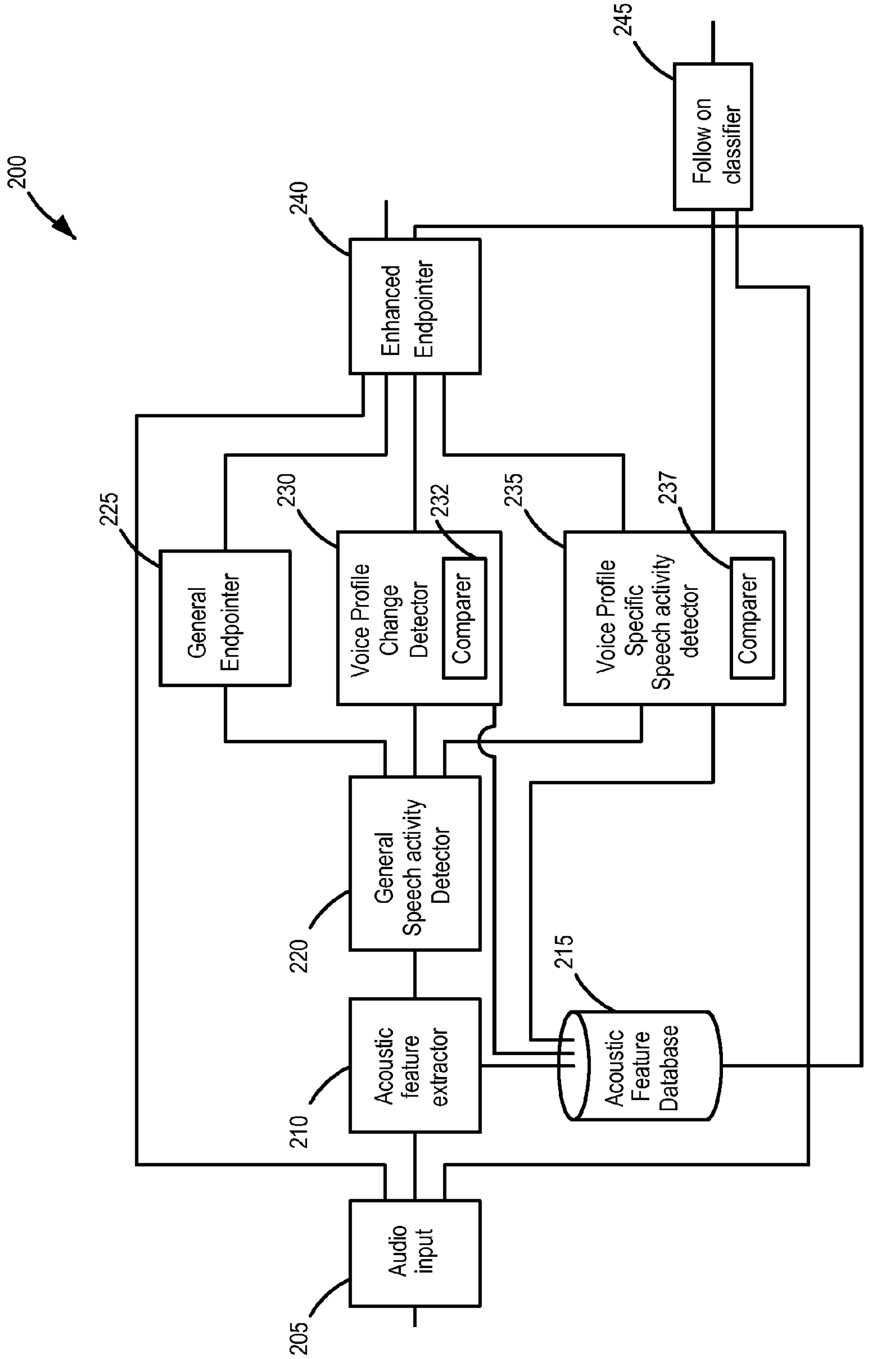
FIG. 2 is a diagram of an example system that identifies speech endpoints of a particular speaker.

FIG. 2 is a diagram of an example system 200 that identifies speech endpoints of a particular speaker. The components of the system 200 may be contained in a computing device such as computing device 124. The system 200 includes an audio input module 205. The audio input module 205 may receive audio data from a microphone or an audio input device attached to an audio jack of the computing device 124. The received audio data may be human speech. In some implementations, the audio input module 205 contains an analog to digital converter. For example, the audio input module may sample the incoming analog signal at a particular frequency and resolution. The audio input module 205 may then perform additional signal processing on the sampled analog signal.

The analog input module 205 provides the processed audio data to the acoustic feature extractor 210. The acoustic feature extractor 210 analyzes the processed audio data to identify acoustic features of the audio data. The acoustic features may include MFC coefficients, filterbank energies, or FFT frames. The acoustic features may be stored in an acoustic features database 215. In some implementations, the acoustic feature extractor 210 analyzes the processed audio data in audio frames. Each audio frame may be a particular length. For example, the acoustic feature extractor 210 may analyze a three hundred millisecond window of frames of the processed audio data and identify acoustic features of each window. In some implementations, a window of data includes a series of consecutive frames. The acoustic feature extractor 210 may then store the acoustic features in the acoustic features database 215.

The acoustic features database 215 stores the acoustic features provided by the acoustic feature extractor 210. In some implementations, the acoustic features database 215 stores other identifying information along with the acoustic features. For example, acoustic features database 215 may store a timestamp, the corresponding audio data, a corresponding voice profile, and/or an utterance identifier to identify acoustic features that were identified from a common utterance.

The general speech activity detector 220 receives acoustic features from the acoustic feature extractor 210. The general speech activity detector 220 analyzes the acoustic features to determine if the corresponding audio input is human speech. In some implementations, the general speech activity detector 220 determines a score based on the acoustic features for each audio frame. If the score for a particular audio frame satisfies a threshold, then the general speech activity detector 220 labels that audio frame as human speech. If the score for a particular audio frame does not satisfy a threshold, then the general speech activity detector 220 labels that audio frame as non-human speech.

The general endpointer 225 receives data from the general speech activity detector 220 and identifies beginning points and ending points of speech in the received data. The general endpointer 225 receives data indicating whether a particular audio window corresponds to speech or non-speech. When there are a particular number of audio frames of a window that do not correspond to speech, then the general endpointer 225 determines that there is a beginning point or an ending point where the window that do not correspond to speech stop or start. For example, if each audio window is three hundred milliseconds and the general endpointer 225 receives data indicating that there are ten audio frames that do not correspond to speech, then the general endpointer 225 may determine that there is an ending point before the audio window and a beginning point at the end audio window. In this instance, the general endpointer 225 determined that there were three seconds of non-speech and compared that to a threshold that was three seconds or less. If the threshold were greater than three seconds, then the general endpointer 225 would not have added beginning points and ending points at the beginning and end of three seconds of non-speech.

The voice profile change detector 230 receives data from the general speech activity detector 220 and the acoustic features database 215 to determine if the audio input contains a change in the voice profile from an initially generated voice profile. The voice profile change detector 230 receives data from the general speech activity detector 220 that indicates the audio frames that correspond to speech or non-speech.

The voice profile change detector 230 also receives data from the acoustic features database 215 that indicates the acoustic features of the audio frame that the comparer 232 analyzes to determine voice profiles from previously received audio frames. The comparer 232 may compare initially generated voice profiles from initial audio frames to voice profiles generated from the data received from the general speech activity detector 220. In instances where there are no acoustic features in the acoustic features database 215, then the voice profile change detector may not be able to compare any received acoustic features to acoustic features in the acoustic features database 215. In this case, the voice profile change detector may not be able to detect a change in the voice profile.

By way of example, when the system 200 receives an audio input for the first time, the acoustic feature extractor 210 stores the acoustic features of the first audio frame in the acoustic features database 215. When the voice profile change detector 230 analyzes the first audio frame, the voice profile change detector 230 uses that audio frame to generate a voice profile. At this point, the voice profile change detector 230 cannot compare the voice profile to anything because there is no other data in the acoustic feature database 215. At the second audio frame, the voice profile change detector 230 generates a second voice profile that corresponds to the second audio frame, assuming that the general speech activity detector 220 determines that the second audio frame corresponds to speech. The voice profile change detector 230 reads the acoustic features that correspond to the first audio frame from the acoustic features database 215 and generates a voice profile corresponding to the first audio frame. The comparer 232 compares the voice profile corresponding to the first audio frame to the voice profile corresponding to the second audio frame to determine if the speech of the two audio frames correspond to the same speaker.

The voice profile specific speech activity detector 235 generates a voice profile that is specific to the computing device 124 and compares that voice profile to voice profiles generated from the acoustic features identified by the acoustic features extractor 210. In some implementations, the voice profile specific speech activity detector 235 generates a specific voice profile based on the first voice data that the computing device 124 receives. The voice profile specific speech activity detector 235 gathers voice data until the voice profile specific speech activity detector 235 has enough voice data to generate a voice profile. The amount of voice data that the voice profile specific speech activity detector 235 may require to generate a voice profile may be dependent on the quality of the voice data. For example, the voice profile specific speech activity detector 235 may require more voice data if the voice data has significant background noise. In some implementations, the voice profile specific speech activity detector 235 generates a specific voice profile based on a request from a user. For example, a user may initiate, on the computing device 124, the generation of a voice profile. The computing device 124 may present a series of words for the user to speak. The computing device 124 can record the user's voice and the voice profile specific speech activity detector 235 can generate a new voice profile.

The voice profile specific speech activity detector 235 can use the stored voice profile to compare subsequent voice profiles using the comparer 237. In some implementations, the comparer 237 can compare the voice profiles using second language (L2) similarities. The comparer 237 may determine a score that indicates the similarity of the stored voice profile and the subsequent voice profiles. If the score satisfies a threshold, then the voice profile specific speech activity detector 235 may determine that the respective voice profile matches the stored voice profile.

The enhanced endpointer 240 determines the beginning points and ending points of a particular user's utterance based on data received from the general endpointer 225, the voice profile change detector 230, and the voice profile specific speech activity detector 235. The enhanced endpointer 240 also receives the audio data from the audio input module 205. The enhanced endpointer 240 identifies the beginning points and ending points of utterances of a particular speaker in the audio data.

In some instances, the voice profile specific speech activity detector 235 indicates to the endpointer 240 that the voice profile specific speech activity detector 235 does not have enough specific speech data to determine if any received audio data corresponds to a specific voice profile. When the endpointer 240 receives such an indication, the endpointer 240 determines that the beginning points and the ending points are as indicated by the general endpointer 225. For example, when a user first uses the computing device to process a voice command, the voice profile specific speech activity detector 235 will not have gathered any voice data. Therefore, the endpointer 240 will use data received from the general endpointer 225 to determine beginning points and ending points.

In some instances, the voice profile specific speech activity detector 235 indicates that the voice profile specific speech activity detector 235 does have enough specific speech data to determine if any received audio data corresponds to a specific voice profile. When the endpointer 240 receives such an indication, then the endpointer 240 determines that the beginning points and the ending points are as indicated by the voice profile specific speech activity detector 235. For example, the voice profile specific speech activity detector 235 has gathered enough data to identify the voice profile of a particular user and identifies audio data as corresponding to the particular user. Therefore, the endpointer 240 will use data received from the voice profile specific speech activity detector 235 to identify beginning points and ending points.

In some implementations, the enhanced endpointer 240 outputs data indicating the beginning points and ending points. For example, the data may be timestamps that correspond to particular portions of the audio data. The data may also be the audio data with metadata that indicates the locations of the beginning points and the ending points. The enhanced endpointer 240 may also write data to the acoustic feature database 215. That data may indicate the audio data that the enhanced endpointer 240 identified as belonging to the particular user.

The follow on classifier 245 receives data from the voice specific speech activity detector 235 and audio data from the audio data module 205. The follow on classifier 245 identifies subsequent audio data that is from the particular user. In some implementations, a microphone of the computing device 124 remains active after the computing device 124 processes some initial audio data and has identified a voice profile of a particular user. The microphone receives and the audio input module 205 processes subsequent audio data. The follow on classifier 245 receives the subsequent audio data, identifies a voice profile associated with the subsequent audio data, and compares the identified voice profile to the voice profile of the particular user. If the profiles match, then the follow on classifier 245 will process the subsequent audio data and identify a command from the subsequent audio data. If the profiles do not match, then the follow on classifier 245 may not identify a command from the subsequent audio data.

As an example, the computing device 124 identifies beginning points and ending points for audio data corresponding to "OK computer, remind me to buy milk" "tomorrow" from a particular user. The computing device 124 generates a voice profile based on the audio data and determines the command to create a reminder to buy milk for the following day. The microphone of the computing device 124 remains active and receives audio data corresponding to, "Is it one o'clock?" The follow on classifier 245 generates a voice profile based on "is it one o'clock" and determines that the voice profile does not match the voice profile of the particular user. The follow on classifier may not further process this audio data because it does not correspond to the particular user. The microphone may remain active and receive audio data corresponding to, "What time is it?" The follow on classifier 245 generates that a voice profile based on "what time is it" and determines that the voice profile does match the voice profile of the particular user. The follow on classifier 245 then processes a command based on "what time is it" and, in some implementations, will display the current time or play the current time over the speaker of the computing device 245.

Figure 3:
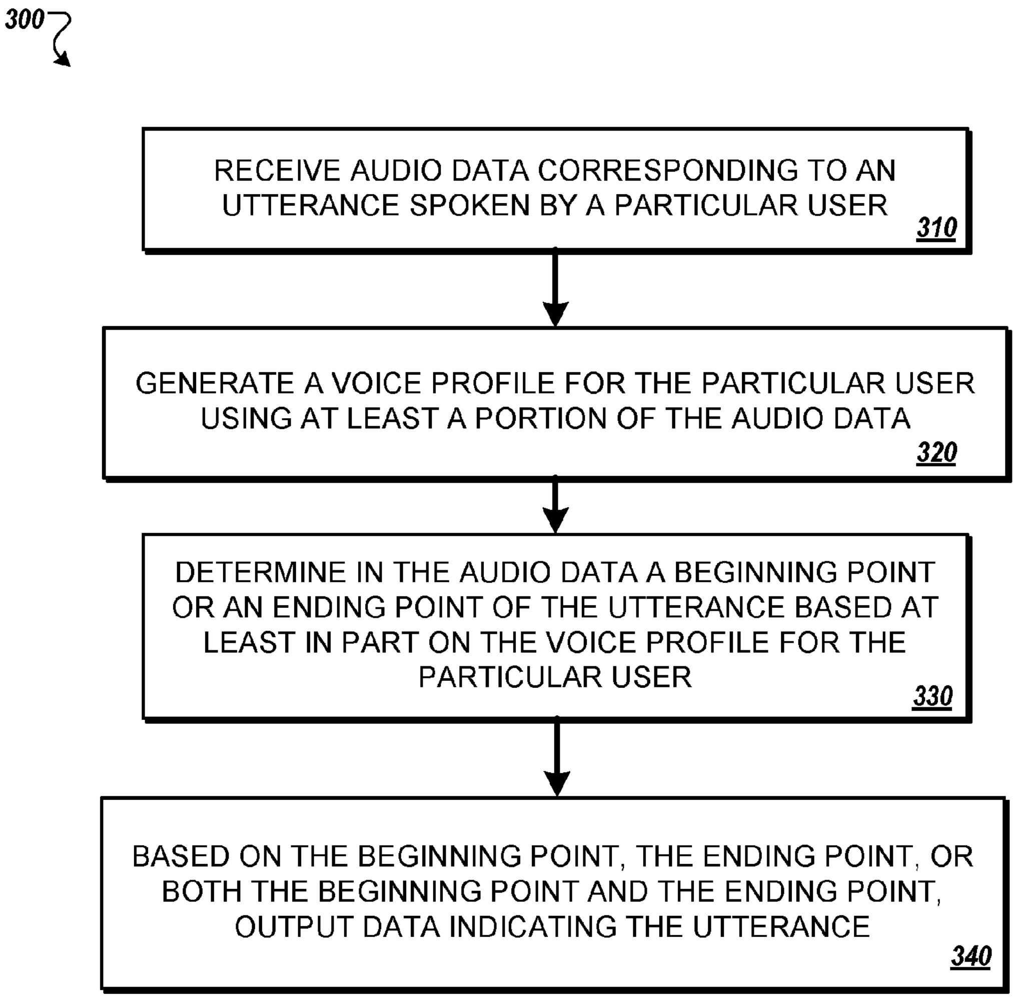
FIG. 3 is a diagram of an example process for identifying speech endpoints of a particular speaker.

FIG. 3 is a diagram of an example process 300 for identifying speech ending points of a particular speaker. The process 300 may be performed by a computing device such as the computing device 124 from FIG. 1. The process 300 analyzes audio data and identifies beginning points and endpoints for utterances of the particular speaker.

The computing device receives audio data corresponding to an utterance spoken by a particular user (310). The audio data may be received through a microphone or through a device connected to an audio jack of the computing device. The computing device may process the audio data using an analog to digital converter and then further sample the digitized audio data.

The computing device generates a voice profile for the particular user using the audio data (320). The voice profile is based on acoustic features that the computing device identifies from the audio data. The computing device identifies the acoustic features by analyzing an initial portion of the audio data. The acoustic features may include MFC coefficients, filterbank energies, or FFT frames. In some implementations, the computing device may determine that the audio data corresponds to speech audio by analyzing the acoustic features. The initial portion of the audio data may be a particular length such as five seconds of audio data or the initial portion may be based on the quality of the audio data. For example, the computing device may be unable to determine accurate acoustic features when the audio data contains background noise and may analyze ten seconds of audio data to generate a voice profile. Alternatively, the computing device may be able to quickly determine accurate acoustic features when the audio data contains minimal background noise and may only analyze three seconds of audio data to generate a voice profile.

The computing device determines a beginning point and an ending point of the utterance based at least in part on the voice profile for the particular user (330). In some implementations, the computing device identifies acoustic features for subsequent portions of the audio data. The computing device uses the acoustic features of the subsequent portions of the audio data to generate a subsequent voice profile. The computing device then compares the generated subsequent voice profile to the voice profile for the particular user. The computing device may compare the voice profiles using L2 similarities. The computing device can then determine, based on the comparison, whether the audio frame from which the subsequent voice profile was generated belongs to the particular user.

Once the computing device determines the audio frames that correspond to the particular user, the computing device can determine the length of time that the audio data contains audio frames that do not correspond to the particular user. If the length of time is greater than a threshold, then the first audio frame in the group is an ending point and the last audio frame is a beginning point. For example, the computing device may determine that ten audio frames do not correspond to the particular user's voice profile. If each audio frame is three hundred milliseconds, then the period of time that the audio data does not correspond to the particular user's voice is three seconds. If the threshold is two seconds, then the computing device will mark the beginning of the three second period as an ending point and the end of the three second period as a beginning point.

The computing device outputs data indicating the utterance based on the beginning point, the ending point, or both the beginning point and the ending point (340). In some implementations, the computing device may output a series of timestamps that correspond to the beginning points and ending points. For example, if the audio data is seven seconds long and there is are beginning points at zero seconds and three seconds and ending points at two seconds and six seconds, then the computing device may output timestamps indicating beginning points at zero seconds and three seconds and ending points at two seconds and six seconds. In some implementations, the computing device may output the audio data. The audio data may contain metadata that indicates the beginning points and the ending points. In some implementations, the computing device may output the portions of the audio data that correspond to the particular user and remove the portions of the audio data that do not correspond to the particular user. In some implementations, the data outputted indicating the utterance based on the beginning point, the ending point, or both the beginning point and the ending point may be used by a speech recognizer or by a query parser. For example, a speech recognizer may receive the utterances "OK, computer, remind me to buy milk" and "Tomorrow" and convert the utterance to text. As another example, the query parser may receive the utterances "OK, computer, remind me to buy milk" and "Tomorrow" and parse the utterances to determine that the computing device should add a reminder to buy milk.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving audio data corresponding to an utterance spoken by a particular user;

generating, by one or more computers, a voice profile for the particular user using at least a portion of the audio data that corresponds to the utterance;

determining, by one or more computers, in the audio data a beginning point or an ending point of the utterance based at least in part on the voice profile for the particular user that is generated using at least the portion of the audio data that corresponds to the utterance; and based on the beginning point, the ending point, or both the beginning point and the ending point, outputting data indicating the utterance.

2. The method of claim 1, wherein generating a voice profile for the particular user using at least a portion of the audio data that corresponds to the utterance comprises:

determining acoustic features of the at least the portion of the audio data;

based on the acoustic features, determining that the audio data is speech audio data; and generating the voice profile for the particular user based on the acoustic features.

3. The method of claim 2, wherein determining in the audio data a beginning point or an ending point of the utterance based at least in part on the voice profile for the particular user that is generated using at least the portion of the audio data that corresponds to the utterance comprises:

determining acoustic features of a subsequent portion of the audio data;

determining a subsequent voice profile based on the acoustic features of the subsequent portion of the audio data;

comparing the subsequent voice profile with the voice profile for the particular user; and based further on comparing the subsequent voice profile with the voice profile for the particular user, determining in the audio data the beginning point or the ending point of the utterance.

4. The method of claim 3, wherein comparing the subsequent voice profile with the voice profile for the particular user comprises comparing using second language similarities.

5. The method of claim 2, wherein the acoustic features comprise mel-frequency cepstral coefficients, filterbank energies, or fast Fourier transform frames.

6. The method of claim 2, wherein a duration of the initial portion of the received audio data is a particular amount of time.

7. The method of claim 1, wherein outputting data indicating the utterance comprises:

outputting a time stamp indicating the beginning point or the endpoint point of the utterance.

8. The method of claim 1, wherein outputting data indicating the utterance comprises outputting the data indicating the utterance to an automatic speech recognizer or a query parser.

9. A system comprising:

one or more computers and one or more storage devices storing instructions that are operable, when executed by the one or more computers, to cause the one or more computers to perform operations comprising:

receiving audio data corresponding to an utterance spoken by a particular user;

generating a voice profile for the particular user using at least a portion of the audio data that corresponds to the utterance;

determining in the audio data a beginning point or an ending point of the utterance based at least in part on the voice profile for the particular user that is generated using at least the portion of the audio data that corresponds to the utterance; and based on the beginning point, the ending point, or both the beginning point and the ending point, outputting data indicating the utterance.

10. The system of claim 9, wherein generating a voice profile for the particular user using at least a portion of the audio data that corresponds to the utterance comprises:

determining acoustic features of the at least the portion of the audio data;

based on the acoustic features, determining that the audio data is speech audio data; and generating the voice profile for the particular user based on the acoustic features.

11. The system of claim 10, wherein determining in the audio data a beginning point or an ending point of the utterance based at least in part on the voice profile for the particular user that is generated using at least the portion of the audio data that corresponds to the utterance comprises:

determining acoustic features of a subsequent portion of the audio data;

determining a subsequent voice profile based on the acoustic features of the subsequent portion of the audio data;

comparing the subsequent voice profile with the voice profile for the particular user; and based further on comparing the subsequent voice profile with the voice profile for the particular user, determining in the audio data the beginning point or the ending point of the utterance.

12. The system of claim 11, wherein comparing the subsequent voice profile with the voice profile for the particular user comprises comparing using second language similarities.

13. The system of claim 10, wherein the acoustic features comprise mel-frequency cepstral coefficients, filterbank energies, or fast Fourier transform frames.

14. The system of claim 10, wherein a duration of the initial portion of the received audio data is a particular amount of time.

15. The system of claim 9, wherein outputting data indicating the utterance comprises:

outputting a time stamp indicating the beginning point or the endpoint point of the utterance.

16. The system of claim 9, wherein outputting data indicating the utterance comprises outputting the data indicating the utterance to an automatic speech recognizer or a query parser.

17. A non-transitory computer-readable medium storing software comprising instructions executable by one or more computers which, upon such execution, cause the one or more computers to perform operations comprising:

receiving audio data corresponding to an utterance spoken by a particular user;

generating a voice profile for the particular user using at least a portion of the audio data that corresponds to the utterance;

determining in the audio data a beginning point or an ending point of the utterance based at least in part on the voice profile for the particular user that is generated using at least the portion of the audio data that corresponds to the utterance; and based on the beginning point, the ending point, or both the beginning point and the ending point, outputting data indicating the utterance.

18. The medium of claim 17, wherein generating a voice profile for the particular user using at least a portion of the audio data that corresponds to the utterance comprises:

determining acoustic features of the at least the portion of the audio data;

based on the acoustic features, determining that the audio data is speech audio data; and generating the voice profile for the particular user based on the acoustic features.

19. The medium of claim 17, wherein outputting data indicating the utterance comprises:

outputting a time stamp indicating the beginning point or the endpoint point of the utterance.

20. The medium of claim 17, wherein outputting data indicating the utterance comprises outputting the data indicating the utterance to an automatic speech recognizer or a query parser.

* * * * *